United States Patent
Hoshino et al.

(10) Patent No.: US 10,655,666 B2
(45) Date of Patent: May 19, 2020

(54) CAULKING BOLT

(71) Applicant: AOYAMA SEISAKUSHO CO., LTD., Niwa-Gun (JP)

(72) Inventors: Naoki Hoshino, Niwa-Gun (JP); Toshiya Ohta, Niwa-Gun (JP); Mitsuki Yoshida, Niwa-Gun (JP); Tomoyuki Fukuchi, Niwa-Gun (JP); Shigeki Matsunami, Niwa-Gun (JP); Yukinori Fujimoto, Niwa-Gun (JP); Jun Omura, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 0 days.

(21) Appl. No.: 15/984,723

(22) Filed: May 21, 2018

(65) Prior Publication Data

US 2018/0266475 A1 Sep. 20, 2018

Related U.S. Application Data

(63) Continuation of application No. PCT/JP2017/005846, filed on Feb. 17, 2017.

(30) Foreign Application Priority Data

Mar. 2, 2016 (JP) ................................. 2016-040181

(51) Int. Cl.
*F16B 37/04* (2006.01)
*F16B 35/04* (2006.01)
*F16B 37/06* (2006.01)

(52) U.S. Cl.
CPC .......... *F16B 35/048* (2013.01); *F16B 37/068* (2013.01)

(58) Field of Classification Search
CPC ................................. F16B 35/048; F16B 35/04
(Continued)

(56) References Cited

U.S. PATENT DOCUMENTS 3,127,919 A * 4/1964 Swanstrom ........... F16B 37/068
411/188
3,770,037 A * 11/1973 Ernest ..................... F16B 35/06
411/184

(Continued)

FOREIGN PATENT DOCUMENTS

EP 2 402 620 A1 1/2012
JP S61-293620 A1 12/1986

(Continued)

OTHER PUBLICATIONS

International Search Report and Written Opinion (Application No. PCT/JP2017/005846) dated Apr. 7, 2017.

(Continued)

*Primary Examiner* — Gary W Estremsky
(74) *Attorney, Agent, or Firm* — Burr & Brown, PLLC (57) ABSTRACT

There is provided a caulking bolt which can be fastened by a general nut even when used to fix thin plates to each other, and which can also provide fitting strength similar to that of conventional products. The caulking bolt includes a head part and a shaft part, and has a non-circular, flat, rotation preventive protrusion formed on a seat surface of the head part. Also, the upper end of a normal complete thread part formed in the shaft part is brought close to the seat surface of the head part with a distance of 3 pitches or less, and an incomplete thread part formed at the portion of 3 pitches or less is used as a stopper part into which a metal flows when the caulking bolt is driven into a metal plate.

3 Claims, 12 Drawing Sheets

(58) Field of Classification Search
USPC .................................. 411/180, 184, 188, 968
See application file for complete search history.

(56) References Cited

U.S. PATENT DOCUMENTS

| | | | | |
|---|---|---|---|---|
| 3,782,436 | A * | 1/1974 | Steiner | F16B 35/06 411/184 |
| 4,842,463 | A * | 6/1989 | Landt | F16B 39/282 411/188 |
| 5,356,253 | A * | 10/1994 | Whitesell | F16B 25/0021 411/188 |
| 5,513,933 | A * | 5/1996 | Rom | B23P 19/062 29/432.2 |
| 6,125,524 | A * | 10/2000 | Mueller | B23P 19/062 29/515 |
| 6,206,737 | B1 * | 3/2001 | Bonilla | H01R 4/304 411/188 |
| 7,462,043 | B2 * | 12/2008 | Deisenhofer | H01R 4/646 411/149 |
| 7,815,406 | B2 * | 10/2010 | Babej | B23P 19/062 411/181 |
| 8,939,689 | B2 * | 1/2015 | Babej | F16B 19/00 411/180 |
| 8,979,455 | B2 * | 3/2015 | Burton | F16B 33/002 411/166 |
| 9,297,405 | B2 * | 3/2016 | Diehl | B23P 19/00 |
| 2012/0003059 | A1 * | 1/2012 | Tamaki | F16B 35/048 411/166 |
| 2013/0302107 | A1 | 11/2013 | Burton | |

FOREIGN PATENT DOCUMENTS

| | | |
|---|---|---|
| JP | 2011-241905 A1 | 12/2011 |
| JP | 2012-013121 A1 | 1/2012 |

OTHER PUBLICATIONS

Chinese Office Action (Application No. 201780008322.2) dated Mar. 26, 2020.

* cited by examiner

CAULKING BOLT

FIELD OF THE INVENTION

The present invention relates to a caulking bolt which is driven into a metal plate having a pilot hole formed therein, and caulked and fixed thereto.

BACKGROUND ART

An ordinary method for attaching a member to be fastened to a metal plate involves forming a bolt insertion hole in these two members, respectively, and then inserting a bolt into the holes to fix it by a nut. In the technical fields of automobiles and the like, however, there are also employed a weld bolt whose head part is welded and fixed onto a metal plate and a caulking bolt whose shaft part is inserted through a pilot hole formed in a metal plate and driven into the metal plate to caulk and fix the bolt head part to the metal plate, for simplifying the structure and decreasing the number of assembling steps.

Figure 1:
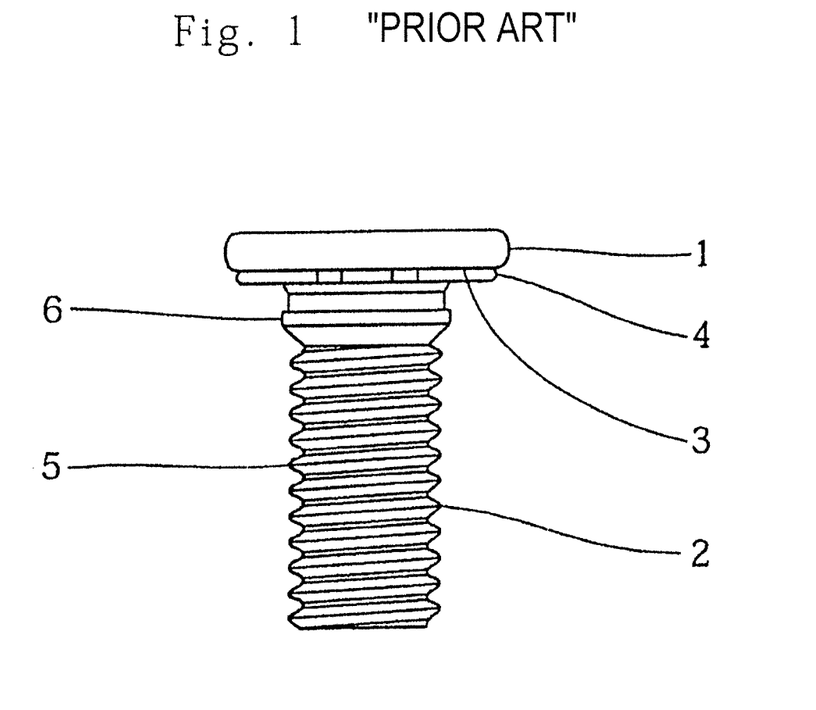
FIG. 1 is a front view of a conventional common caulking bolt.
Figure 2:
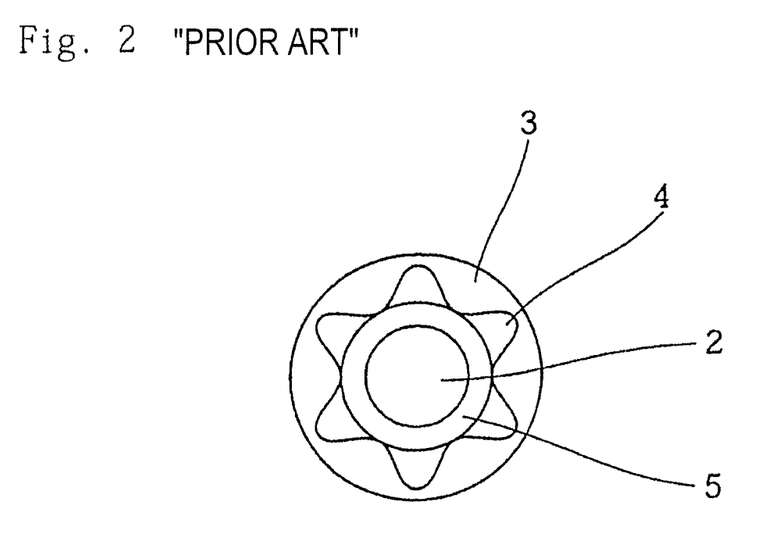
FIG. 2 is a bottom view of the conventional common caulking bolt.

For example, conventional caulking bolts are generally those including a head part 1 and a shaft part 2 wherein a rotation preventive protrusion 4 is formed on a seat surface 3 of the head part and a stopper ring 6 having a diameter larger than that of the shaft part 2 is formed between a normal complete thread part 5 of the shaft part 2 and the rotation preventive protrusion 4, as shown in FIGS. 1 and 2.

Figure 3:
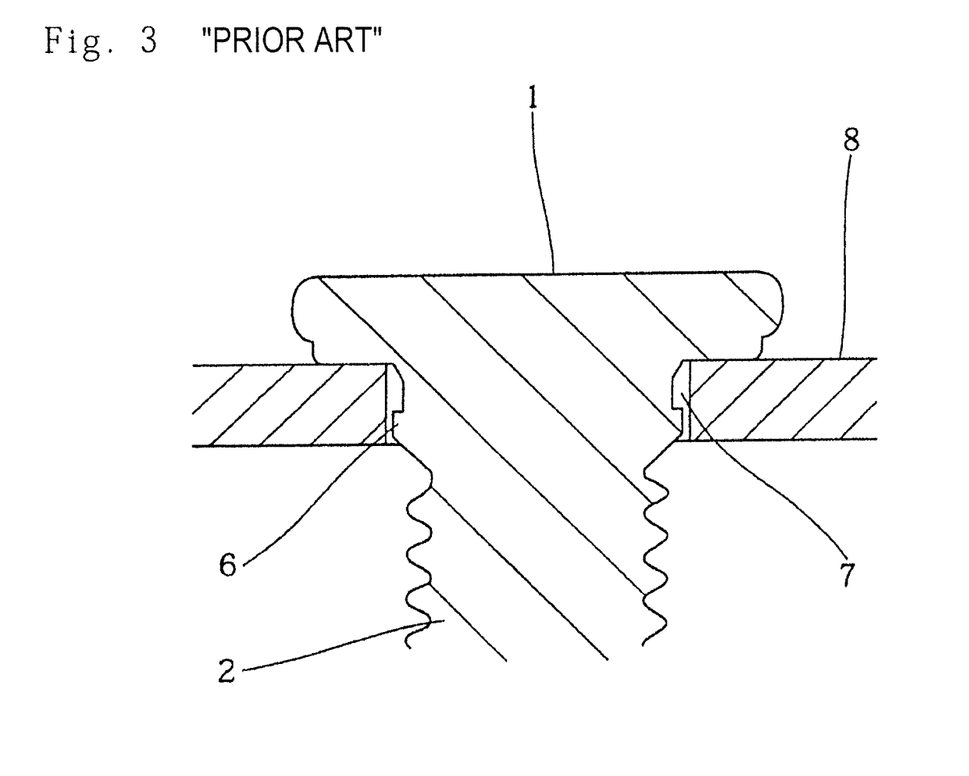
FIG. 3 is a sectional view showing a state before the bolt is driven into a metal plate.
Figure 4:
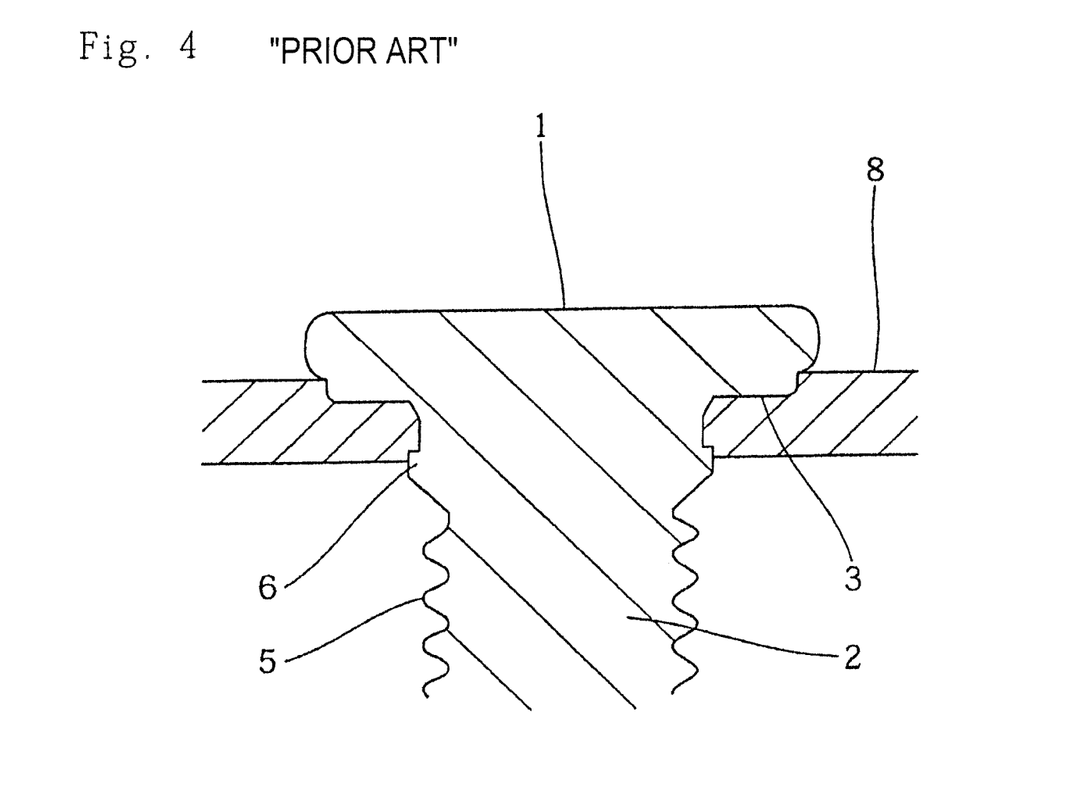
FIG. 4 is a sectional view showing a state where the bolt has been driven into the metal plate.

When such a caulking bolt is driven into a metal plate 8 in which a pilot hole 7 is formed as shown in FIG. 3, the metal is plastically deformed and flows between the seat surface 3 of the head part and the stopper ring 6 as shown in FIG. 4, so that the caulking bolt would not fall out in an axial direction. At the same time, the metal also flows into a concavo-convex part of the rotation preventive protrusion 4, so that the bolt cannot be rotated. Then, the member to be fastened can be attached to the caulking bolt thus fixed to the metal plate 8 by a nut.

Figure 5:
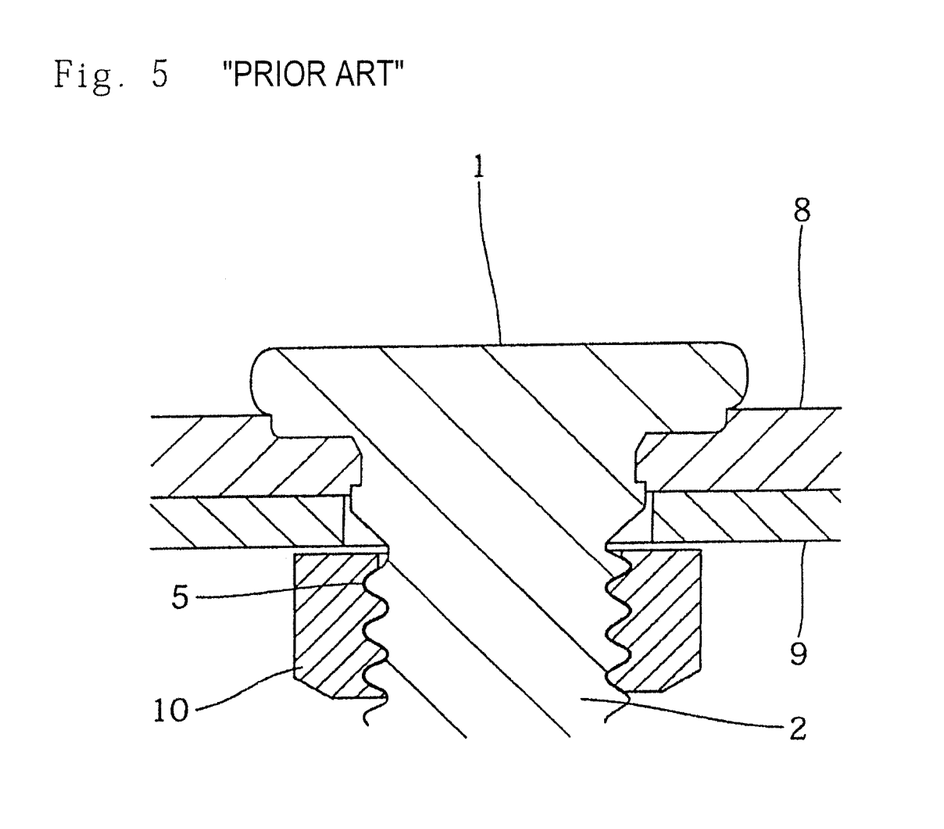
FIG. 5 is a sectional view showing an appearance in which fastening by a general nut cannot be performed when thin plates are fixed to each other.

However, since the normal complete thread part 5 is formed on a tip end side relative to the stopper ring 6, the distance between the seat surface 3 of the head part and the upper end of the normal complete thread part 5 is about 3.5 mm, for example, in the case of M6 bolt. Thus, when both of the metal plate 8 and the member 9 to be fastened are thin, fastening by a general nut 10, as shown in FIG. 5, cannot be performed due to an incomplete thread part formed at the upper end of the normal complete thread part 5. This problem can be solved by interposing a washer having a large plate thickness and/or using a nut having a special shape, but these solutions cause an increase in cost. Accordingly, conventional caulking bolts are disadvantageously hard to use in fixation of thin plates to each other.

Patent Literature 1 discloses a caulking bolt in which a concavo-convex part having both rotation preventing function and stopper function is formed between a seat surface of a head part and the upper end of a normal complete thread part. Also in this caulking bolt, however, the normal complete thread part is formed on the lower side of this concavo-convex part, and thus the distance between the seat surface of the head part and the upper end of the normal complete thread part is increased, so that the caulking bolt is disadvantageously hard to use in fixation of thin plates to each other, as with the above-described conventional caulking bolts.

CITATIONS LIST

Patent Literature 1: JP 2012-13121 A

SUMMARY OF INVENTION

Technical Problems

Accordingly, an object of the present invention is to provide a caulking bolt which can solve the conventional problems as described above, and can be fastened by a general nut, wherein the similar intensity of the engagement can be obtained at a conventional situation, when used to fix thin plates to each other.

Solutions to Problems

The present invention which has been made to solve the above problems relates to a caulking bolt including a head part and a shaft part. In this caulking bolt, a non-circular, flat, rotation preventive protrusion is formed on a seat surface of the head part; the upper end of a normal complete thread part formed in the shaft part is brought close to the seat surface of the head part with a distance of 3 pitches or less; and an incomplete thread part formed at the portion of 3 pitches or less is used as a stopper part into which a metal flows when the caulking bolt is driven into a metal plate.

The rotation preventive protrusion preferably has a toothed gear shape having concave parts and convex parts formed alternately. Also, the thickness of the rotation preventive protrusion is preferably 2 pitches or less of the normal complete thread part.

Advantageous Effects of Invention

In the caulking bolt of the present invention, the upper end of the normal complete thread part formed in the shaft part is brought close to the seat surface of the head part with a distance of 3 pitches or less, and the incomplete thread part formed at the portion of 3 pitches or less is used as a stopper part into which the metal flows when the caulking bolt is driven into the metal plate. The formation of the incomplete thread part at the upper end of the normal complete thread part cannot be avoided when the bolt is threaded using a rolling die. However in the present invention, the metal flows into this incomplete thread part to be as a stopper part, and thus a stopper ring, which has hitherto been considered necessary for caulking bolts, can be omitted.

The distance between the seat surface of the head part and the upper end of the normal complete thread part is defined as 3 pitches or less, and thus, in the case of M6 bolt having a pitch of 1 mm, the distance is 3 mm or less. As a result of this, fixation of thin plates, which cannot be performed by a general nut when conventional caulking bolts are used, can be performed. The caulking bolt of the present invention can provide caulking strength similar to that of conventional products, as illustrated in the Example which will be described later.

Since the non-circular, flat, rotation preventive protrusion is formed on the seat surface of the head part, the caulking bolt of the present invention can provide rotation preventing effect similar to that of conventional products.

DETAILED DESCRIPTION OF THE INVENTION

Hereinafter, an embodiment of the present invention will be described.

Figure 6:
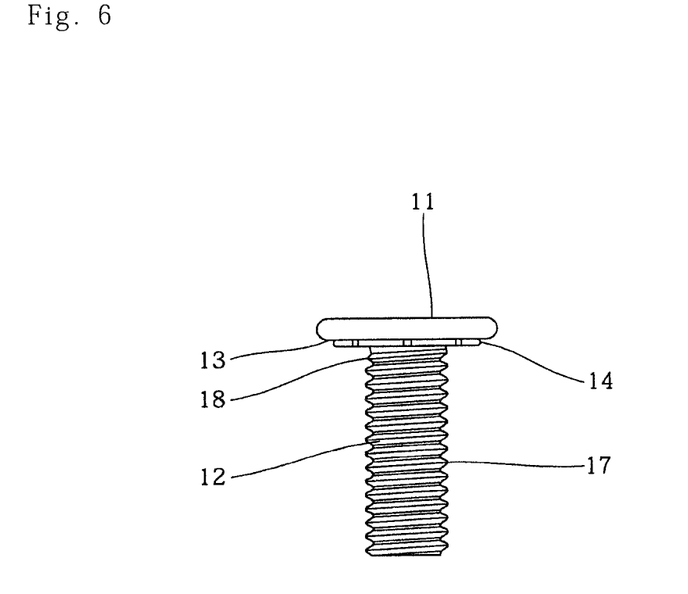
FIG. 6 is a front view of a caulking bolt according to an embodiment of the present invention.
Figure 7:
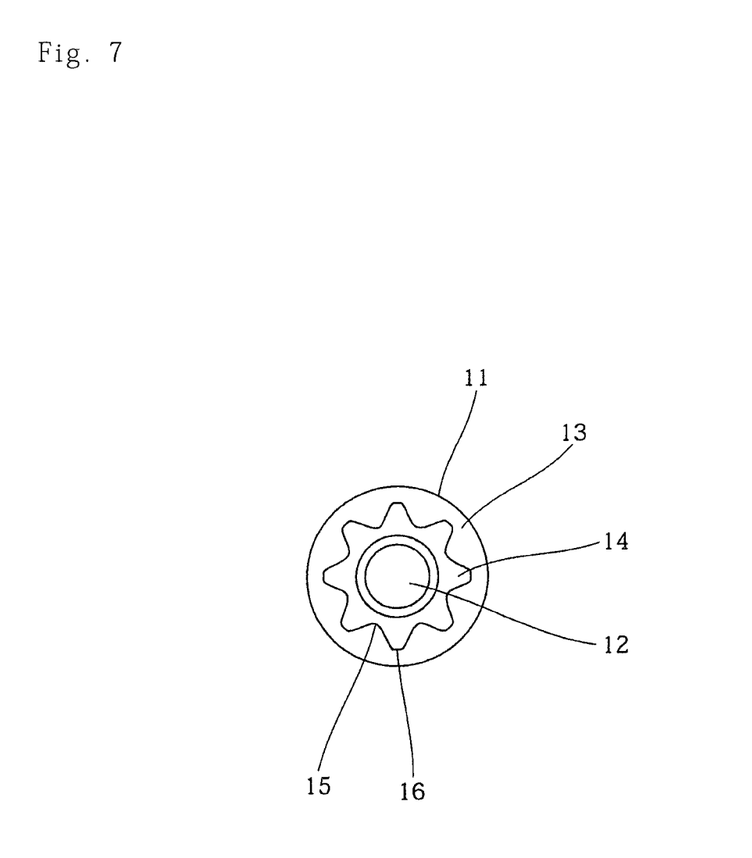
FIG. 7 is a bottom view of the caulking bolt according to the embodiment of the present invention.

FIG. 6 is a front view of a caulking bolt of an embodiment, and FIG. 7 is a bottom view thereof. As shown in these figures, the caulking bolt of the present invention also includes a head part 11 and a shaft part 12.

A non-circular, flat, rotation preventive protrusion 14 is formed on a seat surface 13 of the head part as shown in FIG. 7. The rotation preventive protrusion 14 of this embodiment has a toothed gear shape having concave parts 15 and convex parts 16 formed alternately. While FIG. 7 shows an example where eight concave parts 15 and eight convex parts 16 are formed, the number of each of these parts may also be 3 or 10. However, when the numbers of these parts are increased excessively, the shape of the rotation preventive protrusion 14 gradually approximates a circle, leading to reduction in rotation preventing effect. Therefore, the numbers of concaves and convexes are each preferably defined within a range of about 3 to about 12.

The radial depth of the concaves and convexes can be determined in consideration of the kind of the metal plate to be caulked. In FIG. 7, the diameter of the concave parts 15 is 60% of the diameter of the head part 11, and the diameter of the convex parts 16 is 60% to 80% of the diameter of the head part 11. These values, however, can appropriately be changed depending on the properties of the metal plate to be caulked.

On the other hand, when the axial thickness of the rotation preventive protrusion 14 is increased, thin plates cannot be fixed to each other, as with the caulking bolt of Patent Literature 1. Thus, the thickness of the rotation preventive protrusion 14 is defined as preferably 1 pitch or less, more preferably about 0.5 pitches of the normal complete thread part 17 formed in the shaft part 12. For example, the pitch of the normal complete thread is 1 mm in the case of M6 bolt, and thus the thickness of the rotation preventive protrusion 14 is defined as 1 mm or less, preferably about 0.5 mm. However, when the rotation preventive protrusion 14 is too thin, the rotation preventing effect is reduced. Therefore, the thickness of the rotation preventive protrusion 14 must be at least about 0.2 mm.

The characteristic of the caulking bolt of the present invention resides in that the upper end of the normal complete thread part 17 formed in the shaft part 12 is brought close to the seat surface 13 of the head part with a distance of 3 pitches or less, and the incomplete thread part 18 formed at the portion of 3 pitches or less is used as a stopper part into which metal flows when the bolt is driven into the metal plate.

Figure 8:
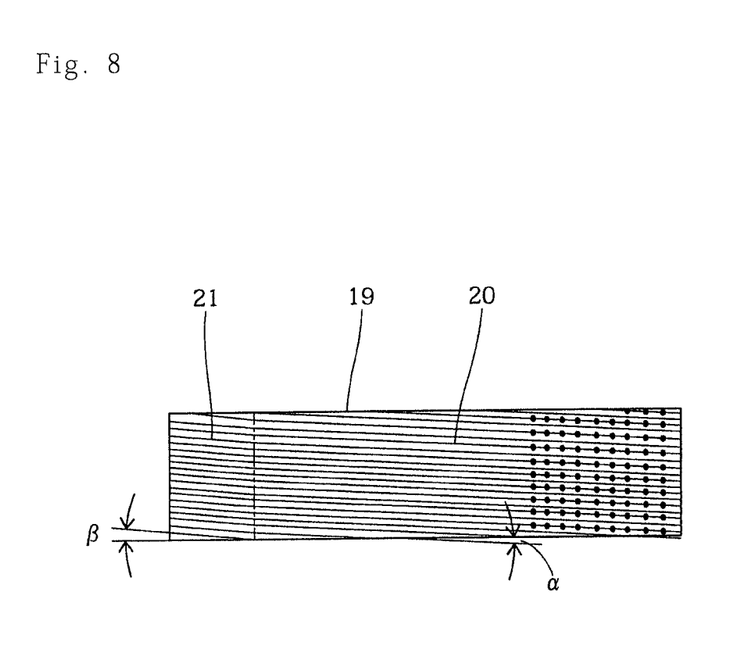
FIG. 8 is a front view of a rolling die used in the manufacture of the caulking bolt of the present invention.

It is difficult to bring the upper end of the normal complete thread part 17 close to the seat surface 13 of the head part by a common rolling method in this manner, but it is made possible by the method described in JP 1509359 B of the present applicant. This method involves forming, in the terminal part of a rolling die 19, a terminal screw thread part 21 having a lead angle β which is larger than a lead angle α of a common screw thread part 20 as shown in FIG. 8, and, in a final stage of screw rolling by the common screw thread part 20, moving a blank by a distance corresponding to a lead angle difference (β−α) to the die side in the terminal screw thread part 21, thereby making it possible to form the normal complete thread part 17 up to the vicinity of the seat surface 13 of the head part.

However, the incomplete thread part 18 is formed at the upper end of the normal complete thread part 17 by this method. Such an incomplete thread part 18 has hitherto been considered to be an unnecessary portion which does not function as a screw, but the present invention involves flowing the metal into this portion so that the portion functions as a stopper part, focusing on the fact that this incomplete thread part 18 has concaves and convexes formed in an axial direction.

Figure 9:
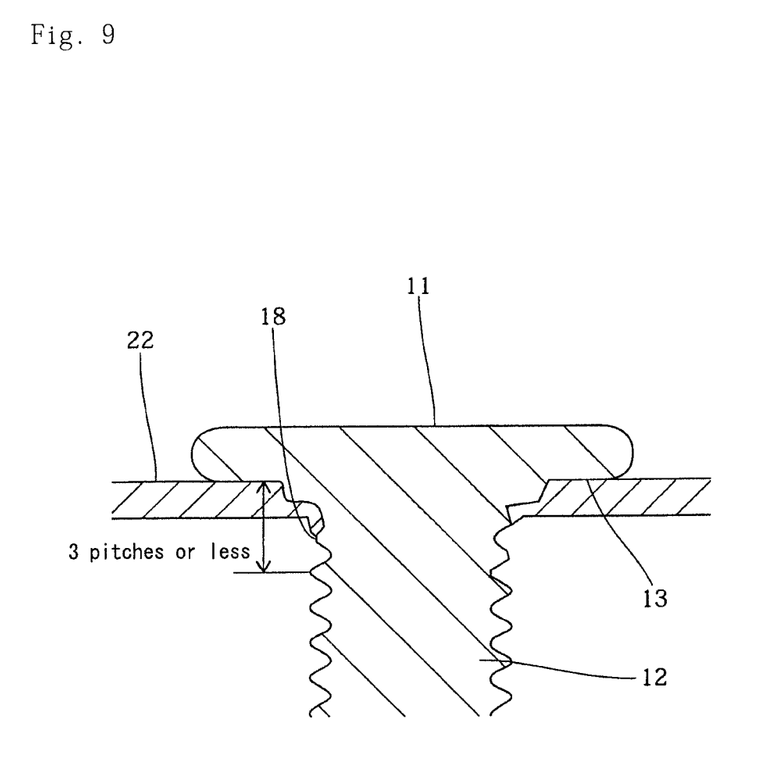
FIG. 9 is a sectional view showing a state where the caulking bolt of the present invention has been driven into a metal plate.

FIG. 9 shows a state where the caulking bolt of the embodiment has been driven into a metal plate 22, and the metal of the metal plate 22 has flowed into the incomplete thread part 18. When the metal is made to flow into the incomplete thread part 18 in this manner, the upper surface of the screw thread of the incomplete thread part 18 is constrained by the metal having flowed therein even when axial (upward) pullout load acts on the caulking bolt, so that the fitted bolt cannot be pulled out.

Figure 10:
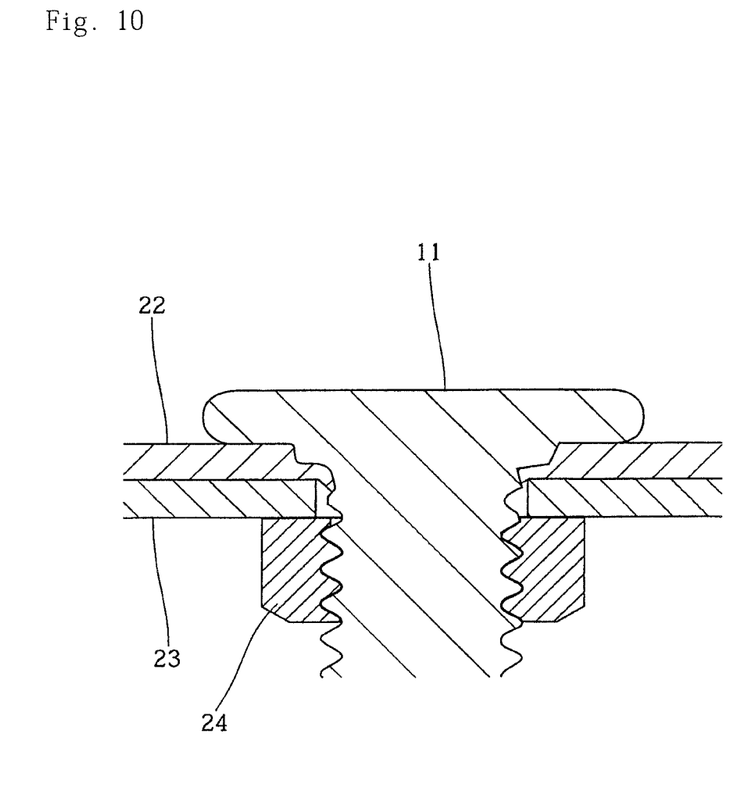
FIG. 10 is a sectional view showing a state where a thin-plate member to be fastened has been fastened.

As described above, the caulking bolt of the present invention is configured so that the upper end of the normal complete thread part 17 is brought close to the seat surface 13 of the head part with a distance of 3 pitches or less. Thus, even when both the metal plate 22 and the member 23 to be fastened are thin plates, fastening by a general nut 24 is possible as shown in FIG. 10. In other words, supposing that the plate thickness of the metal plate 22 is 1.5 mm (1.5 pitches), the distance from the seat surface 13 of the head part to the rear surface of the metal plate 22 is 1.5 mm or less, and the member 23 to be fastened having a plate thickness of 1.5 mm can be fastened by the nut 24.

Besides, as shown in FIG. 9, the rear surface 25 of the metal plate 22 into which the caulking bolt has been driven is made flat up to the vicinity of the normal complete thread part 17 in the shaft part 12. Therefore, the hole diameter of the bolt insertion hole formed in the member 23 to be fastened can be decreased, and the pressure receiving surface at the time of fastening the member 23 to be fastened by means of the nut 24 can be increased.

Further, conventionally, a bolt insertion hole larger than the screw thread diameter of the normal complete thread part 17 had to be formed in the member 23 to be fastened in order to allow passage of the stopper ring, and the member 23 to be fastened was deformed into a ring shape at the time of fastening in some cases. However, the present invention enables the hole diameter of the bolt insertion hole to be decreased, and thus can prevent the deformation of the member 23 to be fastened. Hereinafter, an Example of the present invention will be described.

EXAMPLE

A caulking bolt of M6 size as shown in FIGS. 6 and 7 was manufactured by a rolling method. The upper end of a normal complete thread part was brought close to a seat surface of a head part with a distance of 1 pitch, and the length of an incomplete thread part was defined as 1 pitch. Incidentally, the thickness of the head part was defined as 1.5 mm, and the outer diameter of the head part was defined as 13 mm. Since this bolt is of M6 size, the screw thread diameter of the normal complete thread part formed in a shaft part is 6 mm.

Figure 11:
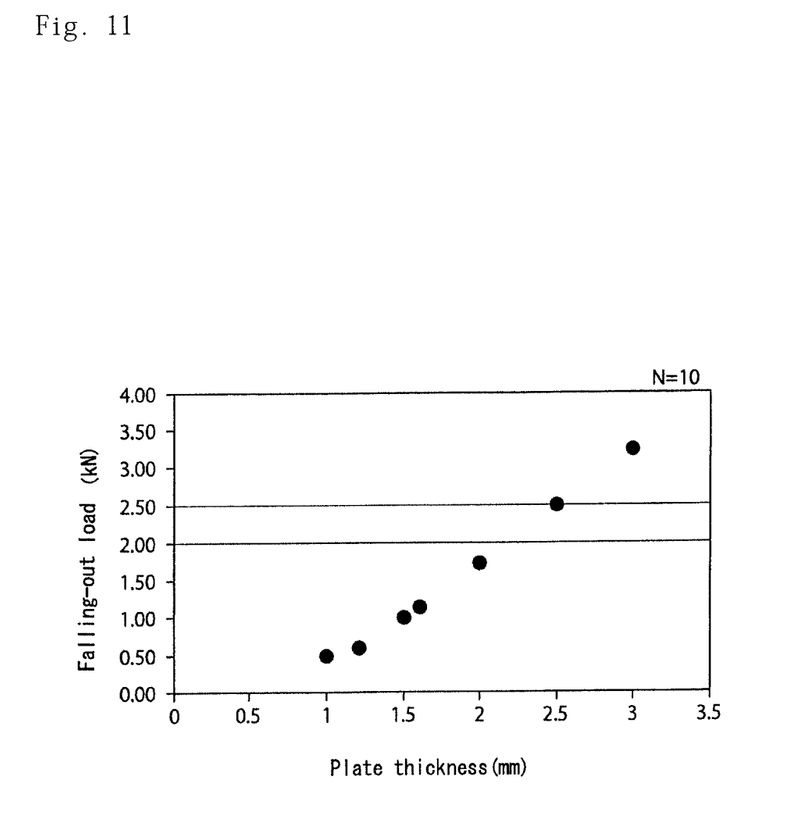
FIG. 11 is a graph showing the falling-out load of a caulking bolt of an Example.

This caulking bolt was inserted into aluminum plates with various plate thicknesses in which a pilot hole having a diameter of 6.2 mm was formed, and impact load was applied to the head part of the bolt by a punch for caulking. Then, load was applied, in a direction toward the head part, to the shaft tip end part of the bolt to measure the load when the caulking bolt fell out from the aluminum plates as falling-out load. The graph of FIG. 11 shows the relationship between the plate thickness of the aluminum plate and the falling-out load. Also when the plate thickness of the aluminum plate is 1 mm, the falling-out load is 0.5 kN (about 50 kgf), which is a value sufficient to prevent the bolt from falling out during conveyance to the nut fastening step after caulking.

Figure 12:
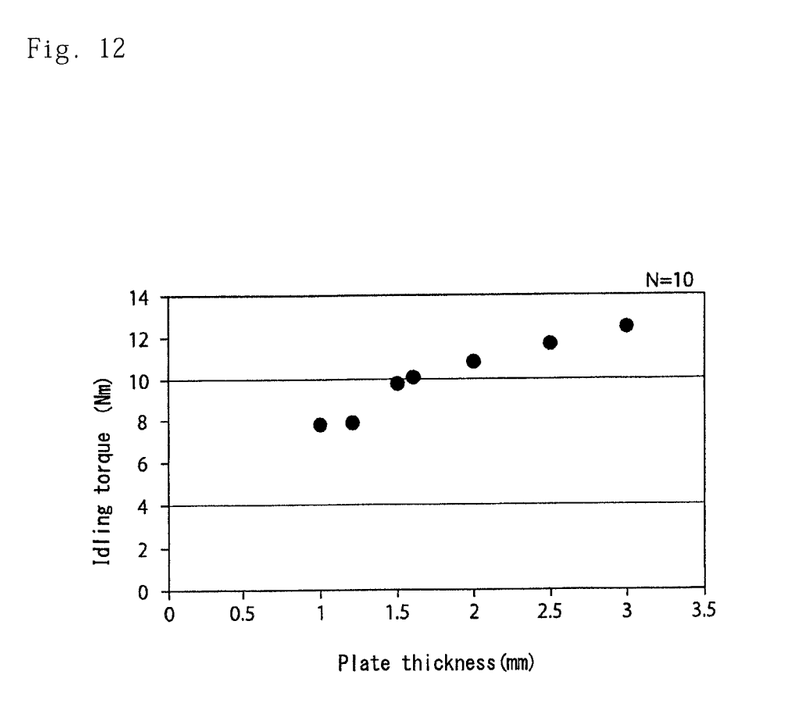
FIG. 12 is a graph showing the idling torque of the caulking bolt of the Example.

Also, the graph of FIG. 12 shows the relationship between the plate thickness of the aluminum plate and the idling torque. The idling torque was measured by a method including applying a rotation torque to the caulking bolt by means of a torque wrench and then measuring the torque when the bolt started to idle. Also when the plate thickness of the aluminum plate is 1 mm, the idling torque is 8 Nm, which sufficiently satisfies the demands of automobile makers.

REFERENCE SIGNS LIST

1: Head part of conventional caulking bolt
2: Shaft part of conventional caulking bolt
3: Seat surface of head part
4: Rotation preventive protrusion
5: Normal complete thread part
6: Stopper ring
7: Pilot hole
8: Metal plate
9: Member to be fastened
10: Nut
11: Head part of caulking bolt of the present invention
12: Shaft part of caulking bolt of the present invention
13: Seat surface of head part
14: Rotation preventive protrusion
15: Concave part
16: Convex part
17: Normal complete thread part
18: Incomplete thread part
19: Rolling die
20: Common screw thread part
21: Terminal screw thread part
22: Metal plate
23: Member to be fastened
24: Nut
25: Rear surface of metal plate

The invention claimed is:

1. A caulking bolt comprising a head part and a shaft part, wherein
a non-circular, flat, rotation preventive protrusion is formed on a seat surface of the head part, the rotation preventive protrusion having a thickness of 1 pitch or less from the seat surface of the head part,
a thread part is formed on the shaft part to be contiguous to the rotation preventive protrusion, the thread part comprising a normal complete thread part having a height of a screw thread and an incomplete thread part,
the upper end of the normal complete thread part is formed in the shaft part at a distance of 3 pitches or less from the seat surface of the head part such that the upper end of the normal complete thread part is in close proximity to the rotation preventive protrusion,
the incomplete thread part is formed along helical lines of the normal complete thread part so as to have a height of a screw thread that is lower than the height of the screw thread of the normal complete thread part by rolling in a longitudinal direction of the shaft part such that the incomplete thread part is arranged within the distance of 3 pitches or less from the seat surface of the head part, and
the incomplete thread part is configured to be used as a stopper part into which a metal flows when the caulking bolt is driven into a metal plate.

2. The caulking bolt according to claim 1, wherein the rotation preventive protrusion has a toothed gear shape having concave parts and convex parts formed alternately.

3. The caulking bolt according to claim 1, wherein the thickness of the rotation preventive protrusion is about 0.5 pitches of the normal complete thread part.

* * * * *